UNITED STATES PATENT OFFICE 2,032,002

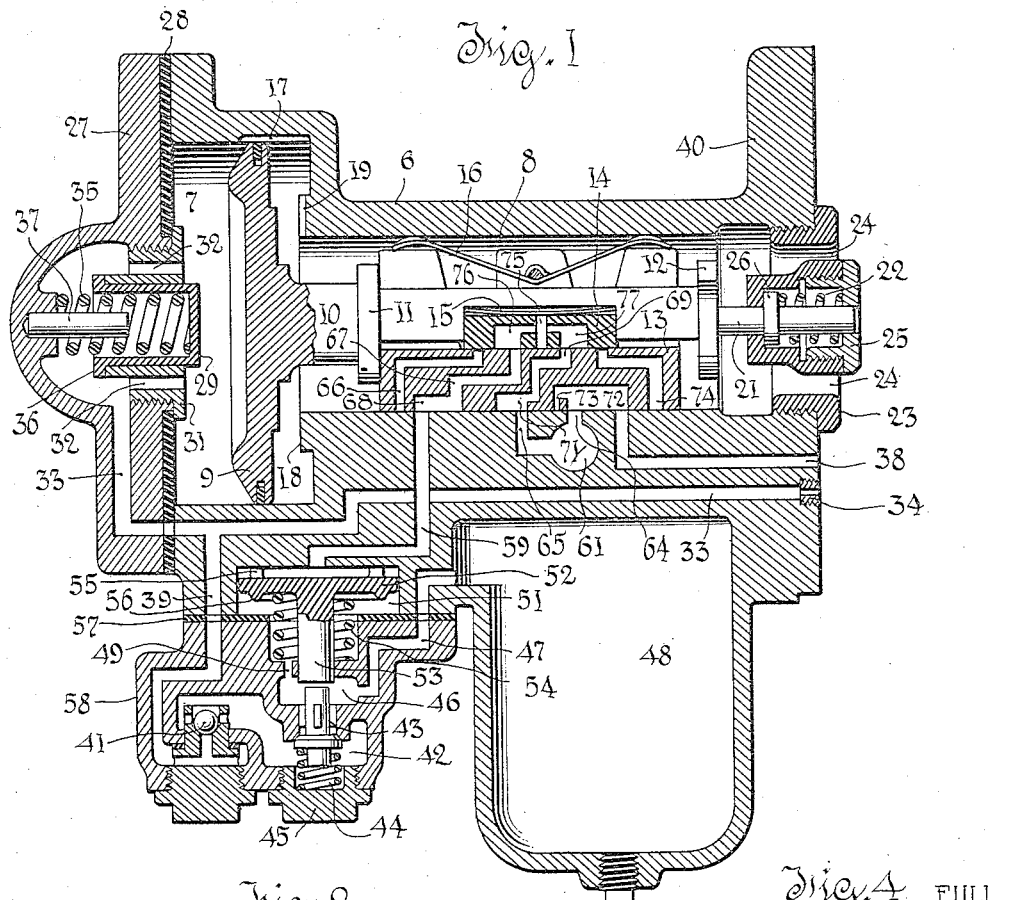

AIR BRAKE

Charles A. Campbell, Watertown, N. Y., assignor to The New York Air Brake Company, a corporation of New Jersey Application February 23, 1932, Serial No. 594,633

21 Claims. (Cl. 303—39)

This invention relates to triple valves, particularly to triple valves of the type in which the brake pipe is vented to a closed chamber in quick service.

In triple valves of this description, it is necessary to vent a considerable volume of air from the brake pipe in order to secure a rapid propagation of the service reduction throughout the length of the brake pipe. With the increasing length of freight trains, the aggregate amount of air which must be vented becomes considerable, and one object of the present invention is to avoid this waste by combining the volume of the quick service chamber with the auxiliary reservoir after the first service reduction. This is practicable provided it is not desired to secure quick service venting in successive reductions after the first.

Another characteristic of the present invention is that the quick service venting is controlled by a valve distinct from the triple slide valve, the quick service valve being actuated by a piston whose movements are controlled by the triple slide valve. The advantage of this arrangement is that it is not necessary to form large ports in the triple slide valve as is necessary if the brake pipe is to be vented rapidly through the slide valve. The objection to forming large ports in the slide valve, particularly if such ports ever register with atmospheric ports, is the loading effect on the slide valve and the consequent increase of its friction. At times such loading may be very detrimental by increasing the frictional resistance of the slide valve to motion.

In certain cases it is possible to secure better results by using a separate quick service valve because the triple valve then carries a smaller frictional load, and hence shifts more freely and promptly. Thus the two valves act serially more promptly than a single valve.

The preferred embodiment of the invention is illustrated in the accompanying drawing, in which,—

Fig. 1 is a vertical axial section through a triple valve embodying the invention, the parts being shown in normal release position.

Fig. 2 is a fragmentary section similar to a portion of Fig. 1 and showing the slide valve and graduating valve in normal recharge position after restricted release.

Fig. 3 is a view showing the valve in quick service position.

Fig. 4 is a view showing the valve in full service position.

Fig. 5 is a view showing the valve in service lap position.

In each of the above views details such as the cylinder and valve chamber bushing have been omittted, but it will be understood that any customary construction may be adopted. The slide valves are shown as if all their ports lay in a single plane so that the concurrent flows can be readily traced in the various figures. In actual practice the ports would not be located in a single plane because it is possible to secure a more compact arrangement and thus reduce the size of the valves and the force with which they are pressed to their seats. However, as many different arrangements of the ports might be adopted without departing from the principle of the invention, the diagrammatic illustration is sufficient for present purposes.

Referring first to Fig. 1, the body of the triple valve is illustrated at 6 and is provided with the usual cylinder 7 for the triple piston, and the usual valve chamber 8 for the slide valve. Working in the cylinder 7 is the usual triple piston 9 having a stem 10 provided with a collar 11 and a guiding spider 12 between which the slide valve 13 is mounted. Limited lost motion is permitted to the slide valve relatively to the piston 9.

Riding on top of the slide valve 13 is the graduating valve 14 which is closely confined in a notch in the stem 10. The graduating valve is held downward by a leaf spring 15 as shown, and it should be explained here that the leaf spring does not obstruct the central port shown through the valve.

The triple slide valve is urged to its seat by the usual bow spring 16.

Formed in the walls of the cylinder 7 is the usual feed groove 17 which is open in all release and recharge positions. The valve has a restricted recharge position at its inward limit of motion at which time the piston seats against the boss or rim 18 and limits the flow to the capacity of the narrow slot 19. The piston is arrested in normal release position by a retard stem 21 which is urged outward by the retard stop spring 22. The stem 21 is slidably mounted in a guideway formed in the nut 23. This nut is threaded into the inner end of the body 6 and is provided with ports 24 through which air flows to and from the auxiliary reservoir. A second nut 25 is threaded into the nut 23 and serves as a guide for the rear end of the stem 21 and also as an abutment for the spring 22. The spring 22 reacts at its forward end against a collar 26 formed on the stem 21, the collar serving also to limit the outward motion of the stem 21.

It will be observed that the retard stop 21 acts against the piston stem 10 and not against the slide valve so that when the piston 9 moves in to restricted recharge position it shifts the slide valve 13 to restricted release position. When the retard stop 21 restores the piston 9 to normal recharge position the slide valve 13 remains at rest in restricted release position and only the graduating valve 14 moves. In this way the valve is shifted to what is known as normal recharge after restricted release position (Fig. 2).

The cylinder 7 is closed by a front cap 27 which seats on a gasket 28. The gasket 28 extends inward so as to serve as a seat for the triple piston 9, as usual. There is a cup-shaped graduating stop 29 which is guided in a nut 31. The nut 31 is threaded into the front cap 27 and its margin overlies the inner margin of the gasket 28. The nut 31 is ported, as indicated at 32, to offer communication from the outer (left) end of the cylinder 7 to the port 33 which is the brake pipe port. This port 33 is provided with a choke or constriction 34 which might be variously located but is indicated as threaded into the body 6 where the port 33 terminates on the mounting face of the triple valve.

The graduating stop 29 is urged toward the piston 9 by a graduating spring 35 and its motion, under the urge of the spring, is limited by a flange 36 formed on the graduating stop. The spring is centered by a pin 37 fixed in the cap 27, as shown.

The triple valve illustrated is of the so-called pipeless type, that is, it has a mounting flange, part of which appears at 40, intended to be mounted against a support of known form having a central aperture leading to the auxiliary reservoir. Its mounting face is also provided with ports, one of which leads to the brake pipe port 33 and is itself connected with the brake pipe, and the other of which leads to the brake cylinder passage 38 and is itself connected with the brake cylinder. Mounts for pipeless triple valves are well known in the art.

Branching off from the brake pipe passage 33 is a branch passage 39 which leads through a ball check valve 41 to a chamber 42 beneath the quick service vent valve 43. The valve 43 is of the check type and closes in the direction of flow from brake pipe passage 33. It is urged in a closing direction by brake pipe pressure and by a seating spring 44 which is seated in the plug nut 45. The valve 43 controls flow from the chamber 42 to a chamber 46. The chamber 46 communicates through a passage 47 with a quick service measuring chamber 48. Thus, if the valve 43 be unseated, brake pipe air will flow through passage 33, branch 39, past check valve 41, and thence through chambers 42 and 46 through passage 47 to the measuring chamber 48. The purpose of the check valve 41 is to prevent back flow from the chamber to the brake pipe.

Chamber 46 communicates through port 49 with the cylinder space 51 beneath piston 52. The piston 52 has a stem 53 which is in thrust relation with the valve 43, a small amount of clearance being allowed. The stem 53 also serves to guide the piston and to center a thrust spring 54 which surrounds the stem and acts upwardly against the piston 52. Piston 52 is prevented from seating and sealing at the limit of its upward motion by the standoff lugs 55. It is provided on its lower face with a rim 56 which at its lower limit of motion seats on the gasket 57. The gasket 57 serves also to seal the joint between the main body 6 and the auxiliary body 58 which houses the check valve and the quick service valve.

The piston 52 makes a loose and leaky fit in the cylinder 51. A port 59 leads from the space in cylinder 51 above piston 52 and terminates in the seat for slide valve 13. The brake cylinder port 38 also terminates in the slide valve seat.

Formed in the body 6 is the exhaust passage 61 which leads through the body to atmosphere. Leading from the exhaust passage 61 is a main exhaust port 64 and a branch exhaust port 65 in the seat for the slide valve 13.

The slide valve is provided with a through port 66 which in normal release position is blanked at both ends. This port functions only when the slide valve 13 has been moved into restricted release position, at which time it registers with the seat port 59. There is a through port 67 having a longitudinally extended recess 68 at its lower end, this recess causing the port 67 to register with the port 59 in quick service, full service and service lap positions.

There is a through port 69 which is formed with an extension 71 at its lower end, the length of the extension 71 being such that it registers with the port 65 in both release positions of the slide valve.

There is formed in the lower face of the slide valve 13 an exhaust cavity 72 which has a restricted extension or tail port 73. In normal release position the cavity 72 connects the brake cylinder port 38 freely with the exhaust port 64, but after the slide valve 13 has been moved to restricted release position (from which it is not returned by the retard stop) a restriction or tail port 73 is interposed so that the exhaust flow is from the port 38 to the port 64 by way of the restriction 73 and consequently takes place at a slow rate. There is a through port 74 which leads from the top to the bottom face of the slide valve. The upper end of this port is controlled by the graduating valve 14, that is to say, it is completely exposed when the graduating valve is in its outermost (left hand position) relatively to the slide valve 13, and completely closed when the graduating valve is in its innermost (right hand) position relatively to the slide valve 13. This port registers partially with the brake cylinder port 38 in quick service position and registers fully in full service and service lap positions. The graduating valve 14 is provided with a through port 75, which, as explained, is not blanked by the leaf spring 16. When the graduating valve moves to its leftmost position relatively to the slide valve 13, the port 75 registers with the upper end of port 67. In other positions the port 75 is blanked. In quick service and full service positions the slide valve chamber 8, and consequently the auxiliary reservoir, is connected by way of port 75, port 67, recess 68 and port 59, with the space in cylinder 51 above piston 52. In service lap position the communication is cut off by motion of the graduating valve relatively to the slide valve.

The graduating valve 14 is also provided with connected cavities 76 and 77. When the graduating valve 14 is in its inner (right hand) position relatively to the slide valve 13, the cavities 76, 77 connect the upper end of port 69 with the upper end of port 67. In the outer (left hand) position of the graduating valve 14 relatively to the slide valve 13, cavities 76, 77 connect the upper end of port 69 with the upper end of port 66. The effect is to connect the space above piston 52 with atmosphere in normal release position (Fig. 1) and in normal recharge position after restricted release (Fig. 2).

It has already been explained that the retard stop 21 tends to arrest the piston 9 in normal recharge and release, and the strength of the spring 22 is such that if brake pipe pressure rises at a normal rate, the triple valve will assume the position known as normal release position shown in Fig. 1. If brake pipe pressure rises more rapidly, as it does on the forward part of the train, the triple piston 9 will overpower the retard spring 22 and move inward until its seats on the boss 18. This gives restricted recharge through the groove 19 and restricted release through the tail port 73. The effect is to reduce the consumption of brake pipe air and delay the release of the forward brakes on the train as usual.

When equalization between the auxiliary reservoir and brake pipe pressures is approached, the spring 22 restores the piston 10 and the graduating valve 14, the slide valve 13 remaining at rest. This positions the parts in what is known as normal recharge position after restricted release (Fig. 2). It will be observed that in this position the exhaust from the brake cylinder is still restricted, but the charging rate to the auxiliary reservoir is normal.

If a service reduction of brake pipe pressure be made, piston 9 moves outward until it engages the graduating stem 29, at which point it is arrested in quick service position (Fig. 3). As will be explained under operation, the resulting venting of brake pipe pressure into the quick service chamber causes the piston to move outward to its limit of motion, overpowering the graduating stop and seating against the gasket 28.

Full service position of the valve is shown in Fig. 4. Flow of auxiliary reservoir air to the brake cylinders results in a reduction of auxiliary reservoir pressure and when equalization of brake pipe pressure is approached the graduating spring 35 will move the piston inward. The effect is to shift the graduating valve 14 but not the slide valve 13, and this positions the parts as shown in Fig. 5.

OPERATION

*Normal recharge and release (Fig. 1)*

In normal release the auxiliary reservoir is charged at a normal rate and the brake cylinder is exhausted to atmosphere freely through the cavity 72. Chamber 48 is vented to atmosphere by way of passage 47, chamber 46, port 49, around the edge of piston 52, port 59, port 67, cavities 76, 77, and ports 69 and 65. Obviously the valve 43 will be closed with the piston 52 in its uppermost position.

*Restricted recharge and release*

In this position the piston 9 is against the boss 18. The graduating valve 14 is to the right relatively to the slide valve 13 and the slide valve is in the position shown in Fig. 2. Consequently auxiliary reservoir is charged at a restricted rate and the brake cylinder is exhausted at a restricted rate. The pressure is trapped in the quick service chamber 48 because the graduating valve 14 blanks the upper end of the port 66.

*Normal recharge following restricted release (Fig. 2)*

Upon approach to equalization between brake pipe and auxiliary reservoir pressures, piston 9 moves back to normal recharge position and the parts assume the position of Fig. 2. Exhaust from the brake cylinder remains restricted. The measuring chamber 48 is now vented by way of ports 47, chamber 46, port 49, past the edge of the piston 52, to port 59 as in normal release position, and thence through port 66, cavities 76, 77 and port 69 to the exhaust port 65.

*Quick service position (Fig. 3)*

If the engineer makes a service reduction of brake pipe pressure, the piston moves out until arrested by the retard stop, and the parts are in quick service position of Fig. 3. In this position the graduating valve 14 exposes the upper end of the service port 74 and the service port 74 is in partial register with the brake cylinder port 38. The exhaust from the brake cylinder is cut off. The through port 75 in the graduating valve registers with 67 whose cavity 68 registers with port 59. Consequently auxiliary reservoir air flows to the space above the piston 52 at a rate faster than the rate of leakage around the piston 52. The space below the piston is at atmospheric pressure and as auxiliary reservoir pressure immediately builds up on the upper side of piston 52, this moves down to its lower limit of motion and seals on gasket 27. In such position the quick service valve 43 is forced from its seat and brake pipe air will flow up way of passages 33 and 39, lift check valve 41, and flowing past valve 43 through passage 47 will charge the measuring chamber 48. Flow will terminate usually by equalization of brake pipe pressure with the pressure in the chamber 48. At this time auxiliary reservoir pressure is falling, and the piston 52 will move upward under the urge of the spring 54 upon approach to equalization between the auxiliary reservoir pressure and the pressure in the chamber 48. Generally stated, the piston 52 will remain in its lowermost position as long as auxiliary reservoir pressure is the predominant pressure, but should the piston move up sooner the check valve 41 is an effective safeguard against flow from the auxiliary reservoir to the brake pipe.

There is an important stabilizing effect exerted upon those valves which start to quick service venting position from normal release position following restricted release as compared to those valves which start from normal release position. To reach quick service venting position from normal release position only the piston and graduating valve need move, but in moving to quick service venting position from restricted release position, or from normal recharge position following restricted release, the slide valve must be moved. The slide valve offers greater frictional resistance to motion and hence stabilizes against motion to quick service position those valves which have moved to restricted release position. These are the valves at the front end of the train and consequently those valves which are most likely to be affected by an erratic feed valve. This stabilizing effect is not here claimed broadly being part of the subject of my applications Serial No. 524,740, filed March 23, 1931, and Serial No. 595,642, filed February 12, 1932.

*Full service position (Fig. 4)*

The rapid drop of brake pipe pressure is rendered peculiarly effective upon the piston 9 by the action of the choke 34 so that the piston 9 rapidly moves to its limit of motion seating on gasket 28 and positioning the valve in full service position. The port 59 is still open to the slide valve chamber and the service port 74 is in full register with the brake cylinder port 38.

It will be observed that there is now no opportunity for back flow from the chamber 48 through ports 47 and 49 and around the edge of piston 52 through ports 59, 67 and 75, but little or no flow will take place, for the reason that chamber 48 is approximately at brake pipe pressure and when the pressure in the valve chamber 8 drops to approximate equalization with brake pipe pressure, the graduating spring 35 will force the piston 9 inward to lap position.

*Service lap position (Fig. 5)*

In this position the slide valve 13 remains in the position of Fig. 4. The graduating valve has moved inward so that service port 74 is lapped by the graduating valve and port 75 no longer registers with port 67. This motion inward is initiated by graduating spring 35 assisted by the pressure relation on opposite sides of the piston 9, but the parts are so dimensioned that before the valves reach service lap position of Fig. 5 the flange 36 will terminate the motion of graduating stop 29. Consequently the final lap movement of the piston 9 is produced by an excess of brake pipe pressure over auxiliary reservoir pressure. The ensuing movements of the piston 9 outward, whether caused by brake pipe leakage, or whether caused by a further reduction initiated at the engineer's brake pipe, will shift the graduating valve 14 to expose the service port 74. However, at least as soon as this occurs the port 75 will register with the port 67 connecting the measuring chamber with the auxiliary reservoir so that both furnish air to the brake cylinder. If brake pipe pressure be reduced below equalization with auxiliary reservoir pressure, the quick service chamber will remain connected with the auxiliary reservoir and loss of pressure to the brake pipe will be precluded by the closing of the check valve 41.

Various modifications are possible without departing from the broad scope of the invention. In effect, the piston 52 is a combined piston and check valve, unseated by spring 54 and interposed between port 59 and the chamber 48. This mechanism is capable of various mechanical expressions. Thus while I prefer a simple leaky piston sealing at its limit of motion other arrangements to secure the same operative characteristic will readily suggest themselves.

While the valve described includes no emergency functions, since the invention is concerned merely with service functions, the invention is capable of ready embodiment in triple valves of more or less conventional types which include means for producing emergency applications.

While the poppet type check valve shown is preferred for the quick service valve 43, and a ball check for the valve 41, other types can be used.

This invention can be embodied in triple valves having only a single exhaust position. Furthermore, there is no necessary limitation to the use of a triple valve controlling a single auxiliary reservoir.

Certain features of the piston-actuated quick service valve, also the arrangement in which quick service venting flow occurs from a point between the triple piston and a restriction controlling communication with the brake pipe, and also the arrangement by which the graduating stem ceases to act before the triple valve reaches lap position in moving from service position, are more broadly claimed in my prior application Serial No. 593,635.

What is claimed is,—

1. The combination of a quick service measuring chamber; a triple valve adapted for connection with brake pipe, brake cylinder, and auxiliary reservoir, said triple valve having a release position in which it vents said chamber to atmosphere and a service position in which it establishes a passage through which said chamber is adapted to be connected with auxiliary reservoir; and means rendered active by motion of the triple valve from release toward service position to disconnect said passage from said chamber and connect said chamber with the brake pipe, and then disconnect said chamber from the brake pipe and connect it with said passage.

2. The combination of a triple valve adapted for connection with a brake pipe, brake cylinder and auxiliary reservoir; said triple valve including a graduating valve and a slide valve and having at least two release positions, from one of which the slide valve moves in shifting to quick service venting position, and from another of which the slide valve does not move in shifting to quick service venting position; a quick service measuring chamber; and means rendered operative by the triple valve in shifting from release to quick service venting position and then to service position to connect said chamber first with the brake pipe and then with the auxiliary reservoir.

3. The combination of a triple valve adapted for connection with a brake pipe, brake cylinder, and auxiliary reservoir; a quick service measuring chamber; and means rendered operative by the triple valve in shifting from release position to service position, said means serving to connect said chamber first with the brake pipe and then with the auxiliary reservoir, said triple valve having a lap position to which it moves from service position and from which it may return to service position, the valve being so ported that the connection between the auxiliary reservoir and measuring chamber, when established, is interrupted in lap position and restored in service position.

4. The combination of claim 2 further characterized in that the triple valve has a lap position to which the valve returns from service position and from which it may return to service position, the valve being so constructed that the connection between the auxiliary reservoir and measuring chamber is interrupted in lap position and restored in service position.

5. The combination of a triple valve adapted for connection with a brake pipe, brake cylinder and auxiliary reservoir; a quick service measuring chamber; a piston actuated quick service valve mechanism, the piston of such valve mechanism being subject in a valve closing direction to pressure in the measuring chamber, and said piston serving in valve-closed position to offer a restricted connection, also controlled by the triple valve between said measuring chamber and the auxiliary reservoir, and in valve-open position serving to interrupt said connection and connect said measuring chamber with said brake pipe independently of the triple valve, said triple valve having a service position in which it admits auxiliary reservoir pressure against the piston of said quick service valve mechanism to urge it in a valve-opening direction.

6. The combination of a triple valve adapted for connection with a brake pipe, brake cylinder and auxiliary reservoir; a quick service measuring chamber; a piston actuated quick service valve mechanism, the piston of such valve mechanism being subject in a valve closing direction to pressure in the measuring chamber, and said piston serving in valve-closed position to offer a restricted connection, also controlled by the triple valve between said measuring chamber and the auxiliary reservoir, and in valve-open position serving to interrupt said connection and connect said measuring chamber with said brake pipe independently of the triple valve, said triple valve having a service position in which it admits auxiliary reservoir pressure against the piston of said quick service valve mechanism to urge it in a valve-opening direction, and a lap position in which it isolates said piston from the auxiliary reservoir.

7. The combination of a triple valve adapted for connection with a brake pipe, brake cylinder and auxiliary reservoir; a quick service measuring chamber; a piston actuated quick service valve mechanism, the piston of such valve mechanism being subject in a valve-closing direction to pressure in the measuring chamber, and said piston serving in valve-closed position to offer a restricted connection, also controlled by the triple valve between said measuring chamber and the auxiliary reservoir, and in valve-open position serving to interrupt said connection and connect said measuring chamber with said brake pipe independently of the triple valve, said triple valve having a service position in which it admits auxiliary reservoir pressure against the piston of said quick service valve mechanism, to urge it in a valve-opening direction, a lap position in which it isolates said piston from the auxiliary reservoir; and a release position in which it connects said measuring chamber with atmosphere.

8. The combination of a triple valve adapted for connection with a brake pipe, brake cylinder and auxiliary reservoir; a quick service measuring chamber; a piston actuated quick service valve mechanism, the piston of such valve mechanism being subject in a valve-closing direction to pressure in the measuring chamber, and said piston serving in valve-closed position to offer a restricted connection, also controlled by the triple valve between said measuring chamber and the auxiliary reservoir, and in valve open position serving to interrupt said connection and connect said measuring chamber with said brake pipe independently of the triple valve, said triple valve having a service position in which it admits auxiliary reservoir pressure against the piston of said quick service valve mechanism to urge it in a valve-opening direction, and a release position in which it exhausts said measuring chamber through the restricted connection offered by the quick service piston.

9. The combination of a triple valve adapted for connection with a brake pipe, brake cylinder and auxiliary reservoir; a quick service measuring chamber; a leaky piston interposed in a port controlled by the triple valve and opened thereby in a service position, said port leading from the auxiliary reservoir past said piston to the quick service chamber, the leak past the piston serving as a constriction; a spring urging said piston in a direction opposite to flow toward said chamber; and a normally closed valve controlling a passage from the brake pipe to said chamber and arranged to be opened by said piston in motion against the resistance of said spring.

10. The combination of a triple valve adapted for connection with a brake pipe, brake cylinder and auxiliary reservoir; a quick service measuring chamber; a leaky piston interposed in a port controlled by the triple valve and opened thereby in a service position, said port leading from the auxiliary reservoir past said piston to the quick service chamber and the leak past the piston serving as a constriction; a spring urging said piston in a direction opposite to flow toward said chamber; a normally closed valve controlling a passage from the brake pipe to said chamber and arranged to be opened by said piston in motion against the resistance of said spring; and means for sealing said piston at its limit of motion in a valve opening direction.

11. The combination of a triple valve adapted for connection with a brake pipe, brake cylinder and auxiliary reservoir; a quick service measuring chamber; a leaky piston interposed in a port controlled by the triple valve and opened thereby in a service position, said port leading from the auxiliary reservoir past said piston to the quick service chamber, and the leak past the piston serving as a constriction; a spring urging said piston in a direction opposite to flow toward said chamber; a normally closed valve controlling a passage from the brake pipe to said chamber and arranged to be opened by said piston in motion against the resistance of said spring; and means for sealing said piston at its limit of motion in a valve opening direction, said triple valve having a port open in release position and serving to exhaust said measuring chamber by flow past said leaky piston.

12. The combination of a triple valve adapted for connection with a brake pipe, brake cylinder and auxiliary reservoir; a quick service measuring chamber; a leaky piston interposed in a port controlled by the triple valve and opened thereby in a service position, said port leading from the auxiliary reservoir past said piston to the quick service chamber, the leak past the piston serving as a constriction; a spring urging said piston in a direction opposite to flow toward said chamber; a normally closed valve controlling a passage from the brake pipe to said chamber and arranged to be opened by said piston in motion against the resistance of said spring; means for sealing said piston at its limit of such motion; and a check valve closing against flow from said chamber to the brake pipe.

13. The combination of a triple valve adapted for connection with a brake pipe, brake cylinder and auxiliary reservoir; a quick service measuring chamber; a leaky piston interposed in a port controlled by the triple valve and opened thereby in service position, said port leading from the auxiliary reservoir past said piston to the quick service chamber, the leak past the piston serving as a constriction; a spring urging said piston in a direction opposite to the flow toward said chamber; a check valve controlling a passage leading from the brake pipe to said chamber, said check valve being urged in a closing direction by flow toward said chamber, and arranged to be forced open by said piston when the latter moves in opposition to the resistance of said spring; and a second reversely seated check valve in said passage.

14. The combination of a triple valve adapted for connection with a brake pipe, brake cylinder and auxiliary reservoir; a quick service measuring chamber; a leaky piston interposed in a port controlled by the triple valve and opened thereby in service position, said port leading from the auxiliary reservoir past said piston to the quick service chamber, the leak past the piston serving as a constriction; a spring urging said piston in a direction opposite to the flow toward said chamber; a check valve controlling a passage leading from the brake pipe to said chamber, said check valve being urged in a closing direction by flow toward said chamber, and arranged to be forced open by said piston when the latter moves in opposition to the resistance of said spring; means for sealing said piston at its limit of such motion; and a reversely seated check valve interposed in said passage from the brake pipe.

15. In a triple valve adapted for connection with a brake pipe, brake cylinder and auxiliary reservoir, the combination of a triple piston, a slide valve and a graduating valve, the slide valve having lost motion relatively to the piston; a quick service measuring chamber; a leaky quick service piston interposed in a port controlled by said slide and graduating valves, opened by the initial motion of the graduating valve from a release position and remaining open in service position, said port leading to said quick service chamber; a spring urging said piston in a direction opposite to the flow toward said chamber; and a normally closed valve controlling a passage from the brake pipe to said chamber and arranged to be opened by said piston in motion against the resistance of said spring.

16. In a triple valve adapted for connection with a brake pipe, brake cylinder and auxiliary reservoir, the combination of a triple piston, a slide valve and a graduating valve, the slide valve having lost motion relatively to the piston; a quick service measuring chamber; a leaky quick service piston interposed in a port controlled by said slide and graduating valves, opened by the initial motion of the graduating valve from a release position and remaining open in service position, said port leading to said quick service chamber; a spring urging said piston in a direction opposite to the flow toward said chamber; a normally closed valve controlling a passage from the brake pipe to said chamber and arranged to be opened by said piston in motion against the resistance of said spring; and means for sealing said quick service piston at its limit of motion.

17. In a triple valve adapted for connection with a brake pipe, brake cylinder and auxiliary reservoir, the combination of a triple piston, a slide valve and a graduating valve, the slide valve having lost motion relatively to the piston; a quick service measuring chamber; a leaky quick service piston interposed in a port controlled by said slide and graduating valves, opened by the initial motion of the graduating valve from a release position and remaining open in service position, said port leading to said quick service chamber; a spring urging said piston in a direction opposite to the flow toward said chamber; a normally closed valve controlling a passage from the brake pipe to said chamber and arranged to be opened by said piston in motion against the resistance of said spring; means for sealing said quick service piston at its limit of such motion; and a check valve closing against flow from said chamber to the brake pipe.

18. The combination of a triple valve adapted for connection with a brake pipe, brake cylinder, and auxiliary reservoir; a quick service measuring chamber; means comprising a port in the triple valve for establishing in service position a passage through which said chamber is adapted to be connected with the auxiliary reservoir; and means interposed in said passage and responsive to changes of fluid pressure differential between said chamber and auxiliary reservoir for connecting said chamber first with the brake pipe and then with said passage.

19. The combination defined in claim 18 further characterized in that the triple valve has a lap position to which the valve moves from service position and from which it may return to service position, the valve being so constructed that the passage through which the quick service chamber is adapted to be connected with the auxiliary reservoir is closed in lap position.

20. The combination of a triple valve adapted for connection with a brake pipe, brake cylinder, and auxiliary reservoir; a quick service measuring chamber; means operable to connect said chamber with the brake pipe; means rendered active by the triple valve in moving from release to service position to operate the last-named means; and means responsive at least in part to the development of pressure in the quick service chamber for disconnecting said chamber from the brake pipe and connecting it with the auxiliary reservoir.

21. The combination of a triple valve adapted for connection with brake pipe, brake cylinder and auxiliary reservoir, said triple valve having release and application positions and a lap position to which it may move from service position and from which it may return to service position; a measuring chamber; means rendered effective by motion from release position to service position to charge said chamber from the brake pipe; and means rendered effective by subsequent motion from lap position to service position to supply air from said chamber to the brake cylinder.

CHARLES A. CAMPBELL.